Dec. 19, 1933. L. SUGERMAN Re. 19,030

TWIN SECTION EGG CARTON

Original Filed July 30, 1927

Inventor:
Louis Sugerman,
By Banning & Banning
Attys.

Reissued Dec. 19, 1933

Re. 19,030

UNITED STATES PATENT OFFICE 19,030

TWIN-SECTION EGG CARTON

Louis Sugerman, Chicago, Ill., assignor to Leon Benoit, Chicago, Ill.

Original No. 1,776,844, dated September 30, 1930, Serial No. 209,494, July 30, 1927. Application for reissue March 22, 1933. Serial No. 662,100

14 Claims. (Cl. 229—29)

This invention appertains to cartons and similar receptacles and more particularly to a structure of this character that is usually employed in connection with the packing of eggs for the retail market.

It is an object of this invention to provide a collapsible carton which may be easily unfolded and set up, and which, when set up, is provided with a number of cells or compartments. It is a particular object of the invention to provide such a carton which may be severed into two or more sections, each a complete unit in itself, adapted to receive a plurality of eggs.

The attainment of these and further objects of the invention will be apparent from the following specification taken in conjunction with the drawing forming a part thereof.

Referring to the drawing.

Figure 1:
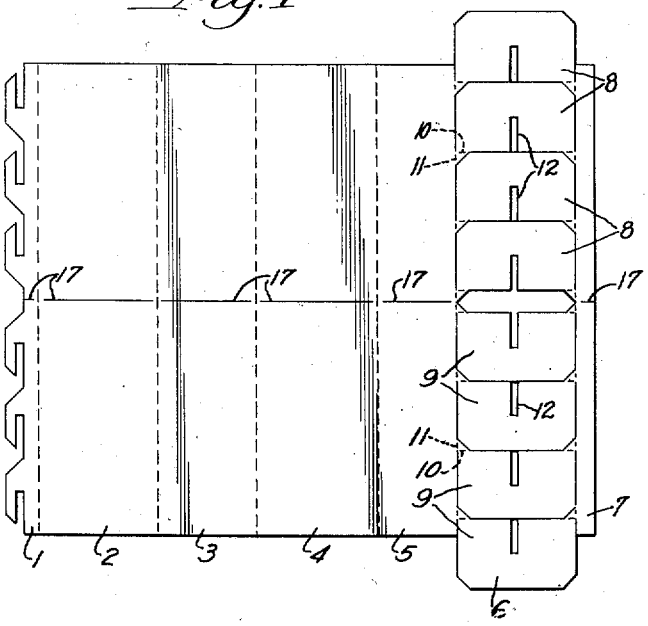
Figure 1 shows a blank piece of pasteboard from which the carton is made.
Figure 2:
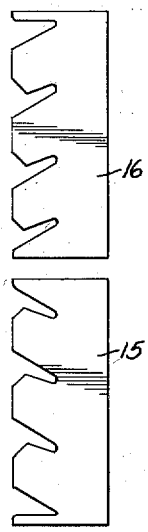
Fig. 2 shows two partitions used in subdividing the cells.

Referring now to Fig. 1, the general shape of the blank piece of paper, cardboard, pasteboard, or the like from which the carton is made, is shown. The dotted lines indicate the lines along which the blank is creased for folding, while the full lines indicate the lines along which the blank is cut.

Figure 3:
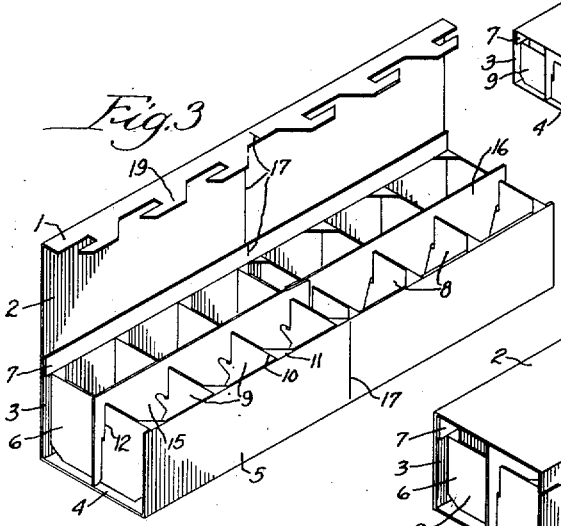
Fig. 3 is a view of the complete carton ready to receive the eggs.

The portions into which the pasteboard is divided by fold lines have been numbered 1 to 7. The portion 1 constitutes the locking strip, 2 the cover, 3 and 5 the longitudinal sides, and 4 constitutes the bottom of the carton. The portion 6 is divided into a number of transverse partitions 8 and 9, connected at their upper front corners to the front side of the carton, and at their upper rear corners to a securing strip 7 which, in the assembled carton, is pasted or otherwise secured to the inner side of the rear wall 3, as may be seen in Fig. 3, when the carton is erected. The partitions 8 and 9 are folded down from a horizontal plane parallel to the plane of the bottom 4 to a plane at right angles thereto, the folding being done along the line 10. In the construction illustrated it is to be noted that there are four transverse partitions 8 on one side of the center of the carton and four transverse partitions 9 on the other side of the center of the carton, the partitions being arranged so that when they are folded into position as shown in Fig. 3, the innermost partition 8 and the innermost partition 9 are adjacent one another. When the partitions 8 and 9 have been folded into the position shown in Fig. 3, the two longitudinal partitions 15 and 16 are inserted into place. The longitudinal partitions have a series of notches or slots therein spaced apart a distance equal to the distance between the transverse partitions 8 or 9, and of a depth to permit the lower edges of the longitudinal partitions to rest on the bottom of the box when the longitudinal partitions are inserted into the slots 12 formed in the transverse partitions.

In the center of each of the blank portions 2, 3, 4, and 5, there is formed a slit 17. The slit in each of these portions extends to within a short distance of the edges thereof and not its entire width. The cut 17 in each portion may be one continuous cut or it may consist of a number of perforations. The portions 1 and 7 may also be cut at their centers for a portion of their width, although these cuts may be dispensed with.

Figure 4:
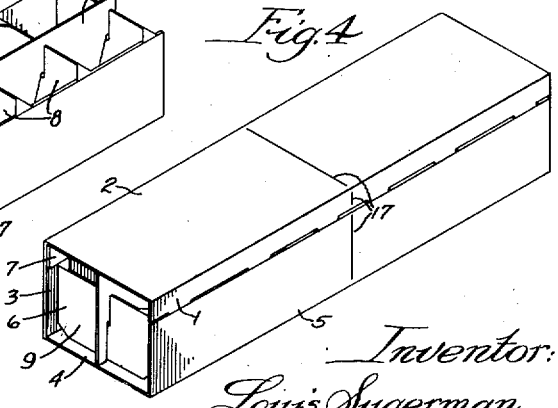
Fig. 4 is a view of the carton shut.

The cover of the carton seen in Figure 3 may be locked in its closed position by engaging the locking tongues 19 beneath the triangular webs defined by the lines 10 and 11. The complete closed carton is shown in Fig. 4.

Figure 5:
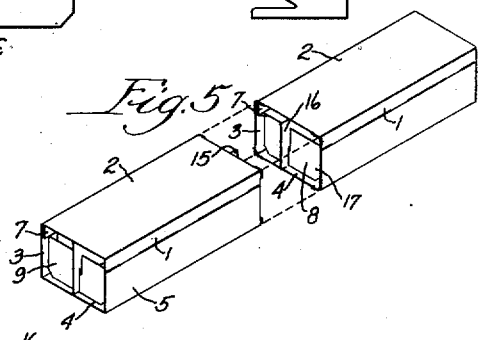
Fig. 5 is a view drawn to a smaller scale than the other figures, showing the carton separated to form two complete sections.

Should a customer desire only six eggs, the merchant may split the carton in half, to form two complete sections, as may be seen in Fig. 5. The splitting of the carton is accomplished by passing a knife through the slits 17, and cutting the slits through the entire sides of the carton. It is to be noted that the longitudinal dividing partition consists of two pieces 15 and 16 and upon dividing the carton in two, each section retains its own longitudinal dividing partition. The locking tongues 19 on each side of the center of the locking strip 1 point in the opposite directions. This tends to maintain the carton against unintentional opening during handling, especially when the carton shown in Fig. 4 is being cut in two.

The empty carton shown in Fig. 3 may be collapsed for shipment by removing the longitudinal partitions 15 and 16 and folding the transverse partitions 8 and 9 so that they lie in a horizontal plane parallel to the plane of the bottom of the carton. The portion of the carton formed by the walls 3, 4, 5, and 6 may then be collapsed by folding the sides 3 and 5 to the right or left until one of these side walls rests on the bottom. The cover 2 may also be folded so that it lies on the portion 6.

In compliance with the requirements of the patent statutes, I have herein described a preferred embodiment of my invention. It is, however, to be understood that the same is shown for illustrative purposes only, and I do not wish to be limited to the precise construction shown.

What I consider new and desire to secure by Letters Patent is:

I claim:

1. A paper carton having walls forming a cover, a bottom and two longitudinal sides, each of the walls being slit transversely at its center, the slit in each wall extending to within a short distance of the edge of the wall, a series of transverse partitions on each side of the center of the carton, said partitions being connected to the carton so as to permit the partitions to swing downwardly from positions in a common horizontal plane to positions in separate vertical planes, the partitions on one side of the center of the carton being arranged to swing in one direction and those on the other side of the center of the carton being arranged to swing in the opposite direction, means on each side of the center of the carton for retaining the transverse partitions in their respective vertical planes, the carton being severable into two sections, each complete in itself, by cutting the respective walls in two along the line of the respective slits.

2. A paper carton having walls forming a cover, a bottom and two longitudinal sides, the walls of the carton being weakened along the transverse center line of the carton, two transverse vertical partitions adjacent one another and located one on each side of the transverse center line of the carton, additional transverse vertical partitions on each side of the center of the carton spaced from the cover and from each other, thereby forming a plurality of cells on each side of the center of the carton, there being two more transverse vertical partitions than there are cells, two longitudinal partitions, one on each side of the transverse center of the carton, said longitudinal partitions dividing each of the cells in two, the carton being severable into two sections, each complete in itself, by tearing the cover, bottom and sides along their weakened portions.

3. A paper carton having walls forming a cover, a bottom, and two longitudinal sides, the walls of the carton being weakened along the transverse center line of the carton so that the carton may be there torn into two sections, a plurality of spaced transverse vertical partitions on each side of the transverse center line of the carton together with a central longitudinal partition dividing the carton into a plurality of cells arranged in two rows lengthwise of the carton, the several cells in the two rows, save the two cells proximate to the transverse center line of the carton, being separated each by a single partition and the number of partitions being two in excess of the number of cells in such rows, two of the transverse vertical partitions being adjacent one another and on opposite sides of the transverse center line of the carton so that upon tearing the carton in two, said last mentioned partitions each constitute one of the end walls of one of the sections each of which is complete in itself, the two carton sections prior to separation being united immovably relative to each other into a rigid structure.

4. As an article of manufacture, a paper carton having walls forming a cover, a bottom, and two longitudinal sides, the walls of the carton being weakened along the transverse center line of the carton so that it may there be readily torn into two like sections, and a plurality of portions extending transversely of the carton forming a single partition separating each two cells save only those two proximate to the transverse center line of the carton, there being on opposite sides of the transverse center line of the carton two transverse partitions each of which, upon separation of the carton into two sections, constitute an end wall for one of said sections, the two carton sections prior to separation being united immovably relative to each other into a rigid structure.

5. As an article of manufacture, a paper carton having walls forming a cover, a bottom, and two longitudinal sides, the walls of the carton being weakened along the transverse center line of the carton so that it may there be readily torn into two like sections, a plurality of cells formed in each of said two sections, there being two transverse cell walls one arranged on each side of the weakened transverse center line, and locking means on each side of the center of the cover of the carton for locking the cover in closed position.

6. As an article of manufacture, a paper carton having walls forming a cover, a bottom and two longitudinal sides, a cell forming wall connecting the sides intermediately of the top and bottom and dividing the carton into a number of cells, certain of the said walls being weakened along the transverse center line of the carton, so that it may there be readily torn into two like sections, and locking means on each side of the center of the carton for locking the cover in closed position, the locking means on the two sides of the center being oppositely directed, so that the locking means on one side prevents longitudinal movement of the cover in one direction and the locking means on the other side prevents longitudinal movement in the other direction.

7. As an article of manufacture, a paper carton having a cover, a bottom and two longitudinal sides, a cell forming wall between the sides, and locking means on each side of the center of the cover engaging cooperating means on the cell forming wall for locking the cover in closed position, said locking means on the two sides of the center being oppositely directed so that the locking means on one side prevents longitudinal movement of the cover in one direction and the locking means on the other side prevents longitudinal movement in the other direction.

8. The method of forming a carton which comprises blanking a sheet of paper to form a cover, bottom, sides and a wall parallel to and intermediate the cover and bottom, blanking the intermediate wall symmetrically about a transverse center to form transverse cell forming walls two of which lie adjacent opposite sides of the transverse center of the carton, weakening the cover, bottom and sides between the two transverse walls centrally of the carton to facilitate tearing of the carton in two, and permanently securing the sides together by means of the intermediate wall.

9. A paper carton having walls in which is included two longitudinal sides, the walls of the carton being weakened along the transverse center line of the carton so that the carton may be there torn into two sections, a plurality of spaced transverse vertical partitions on each side of the transverse center line of the carton extending to and connecting with the side walls and cooperating therewith to divide the carton into a plurality of cells, two of the transverse partitions adjacent one another being on opposite sides of the transverse center line of the carton so that, upon tearing the carton in two, said last mentioned partitions each constitute one end wall of one of the separated sections, each of which is complete in itself, the two sections prior to separation being united immovably relative to each other.

10. A paper carton having walls forming a bottom and two longitudinal sides, the walls of the carton being weakened in a transverse plane, so that the carton may there be torn into two sections, a plurality of intersecting partitions some of which extend transversely across the carton for connection with the longitudinal sides thereof to divide the carton into a plurality of rows of cells extending longitudinally of the carton, two of the transverse partitions adjacent one another being on opposite sides of the transverse plane of tearing of the carton so that, upon tearing the carton in two, said last mentioned walls each constitute one of the ends of one of the separated sections, each of which is complete in itself, the two carton sections prior to separation being united immovably relative to each other.

11. A paper carton having walls forming a bottom, two longitudinal sides, and a cover hinged to one of them, the walls of the carton being weakened along the transverse center line of the carton so that the carton may there be torn into two sections, a plurality of intersecting partitions some of which extend transversely between the side walls for cooperation therewith to divide the carton into a plurality of rows of cells extending longitudinally of the carton, the cover having a free edge formed with locking means adapted for co-action with certain of the carton walls adjacent the carton side opposite which the cover is hinged, and serving, when closed, to cover the plural rows of cells within the carton, two of the transverse vertical partitions adjacent one another being on opposite sides of the transverse center line of the carton so that, upon tearing the carton in two, said last mentioned walls each constitute one of the ends of one of the separated sections, each of which is complete in itself, the two carton sections prior to separation being united immovably relative to each other.

12. A paper carton in which is comprised a central divisible longitudinal partition in spaced relation to opposite longitudinal sides interconnected by transverse vertical partitions, the whole forming a rigid structure subdivided into cells aligned in two rows which extend transversely of each other, the walls of the carton being weakened in a plane between two of its transverse partitions so that it may there be separated into two cellular sections, each complete in itself, and each having for one of its ends one of the transverse partitions proximate to the plane of carton separation.

13. A carton comprising longitudinal side walls and rigidly engaged cross walls dividing the carton into a plurality of rows of cells, the adjacent cells in contiguous rows standing in transversely aligned relation, and the longitudinal side walls being weakened between adjacent cells in contiguous rows to permit the longitudinal walls to be broken to divide the carton into two self-contained cellular sections, each having an end wall afforded by the cross wall adjacent the line of severance, the structures of the two carton sections being rigid and before separation being united immovably to each other.

14. An open-ended carton comprising longitudinal side walls connected integrally to other walls defining cells arranged in plural rows, the adjacent walls in contiguous rows standing in transversely aligned relation, and the longitudinal side walls being weakened between adjacent cell walls in contiguous rows to facilitate breaking of the longitudinal side walls whereby to divide the carton into two self-contained open-ended cellular sections, the structures of the two carton sections being rigid and before separation being united immovably to each other.

LOUIS SUGERMAN.